(12) United States Patent
Zerrer

(10) Patent No.: US 8,485,562 B2
(45) Date of Patent: Jul. 16, 2013

(54) SUCTION LINE COUPLING FOR EMERGENCY VEHICLES

(75) Inventor: Richard Zerrer, Wooster, OH (US)

(73) Assignee: Red Head Brass, LLC, Shreve, OH (US)

( * ) Notice: Subject to any disclaimer, the term of this patent is extended or adjusted under 35 U.S.C. 154(b) by 0 days.

(21) Appl. No.: 13/369,543

(22) Filed: Feb. 9, 2012

(65) Prior Publication Data

US 2012/0261915 A1    Oct. 18, 2012

Related U.S. Application Data

(60) Provisional application No. 61/476,515, filed on Apr. 18, 2011.

(51) Int. Cl.
*F16L 33/00* (2006.01)
(52) U.S. Cl.
USPC ............ 285/251; 285/242; 285/404; 285/903
(58) Field of Classification Search
USPC .......................... 285/903, 242, 259, 251, 404
See application file for complete search history.

(56) References Cited

U.S. PATENT DOCUMENTS

| | | | | |
|---|---|---|---|---|
| 2,848,254 A | * | 8/1958 | Millar | 285/256 |
| 3,639,677 A | * | 2/1972 | Bain | 285/398 |
| 3,993,330 A | * | 11/1976 | Goransson | 285/903 |
| 4,063,757 A | * | 12/1977 | Fuhrmann | 285/903 |
| 4,143,892 A | * | 3/1979 | Murphy et al. | 285/222.2 |
| 4,666,191 A | * | 5/1987 | Sotelo et al. | 285/222.2 |
| 5,074,598 A | * | 12/1991 | Masseth et al. | 285/404 |
| 5,678,867 A | * | 10/1997 | Monaghan et al. | 285/242 |
| 5,947,530 A | * | 9/1999 | Harle | 285/404 |
| 6,106,027 A | * | 8/2000 | Mulvey et al. | 285/251 |
| 6,260,584 B1 | * | 7/2001 | Foti | 285/903 |
| 6,447,028 B1 | * | 9/2002 | LaMarca et al. | 285/404 |
| 7,204,524 B2 | * | 4/2007 | Eccleston | 285/404 |

OTHER PUBLICATIONS

Kochek Co., Inc. Specialty Fire Equipment, 2 pages of web site printouts, (Mar. 16, 2011).
TFT Reinvents Suction Hose, Task Force Tips, 2 pages from brochure (Jul. 2006).
Red Head Brass, LLC, brochure (2 pages); Couplings, Jan. 2012.

\* cited by examiner

*Primary Examiner* — David E Bochna
(74) *Attorney, Agent, or Firm* — Hahn Loeser & Parks LLP; Shannon V. McCue

(57) ABSTRACT

A coupling for a suction line having a corrugated outer surface defining a valley between the corrugations used in connection with an emergency vehicle, the coupler comprising a collar having an inner surface, an internal projection formed on the inner surface of the collar and adapted to be received in the valley of the suction lines to restrict axial movement of the suction line relative to the collar, a receiver formed in the collar axially outward of the internal projection, a shank having a first portion adapted to he inserted within the suction line and a second portion extending outward of the first portion, wherein the second portion is adapted to attach the hose shank to the emergency vehicle, a flange extending radially outward between the first portion and the second portion, and a fastener adapted to selectively extend from the receiver radially inward relative to the flange when located axially outward of the flange.

16 Claims, 5 Drawing Sheets

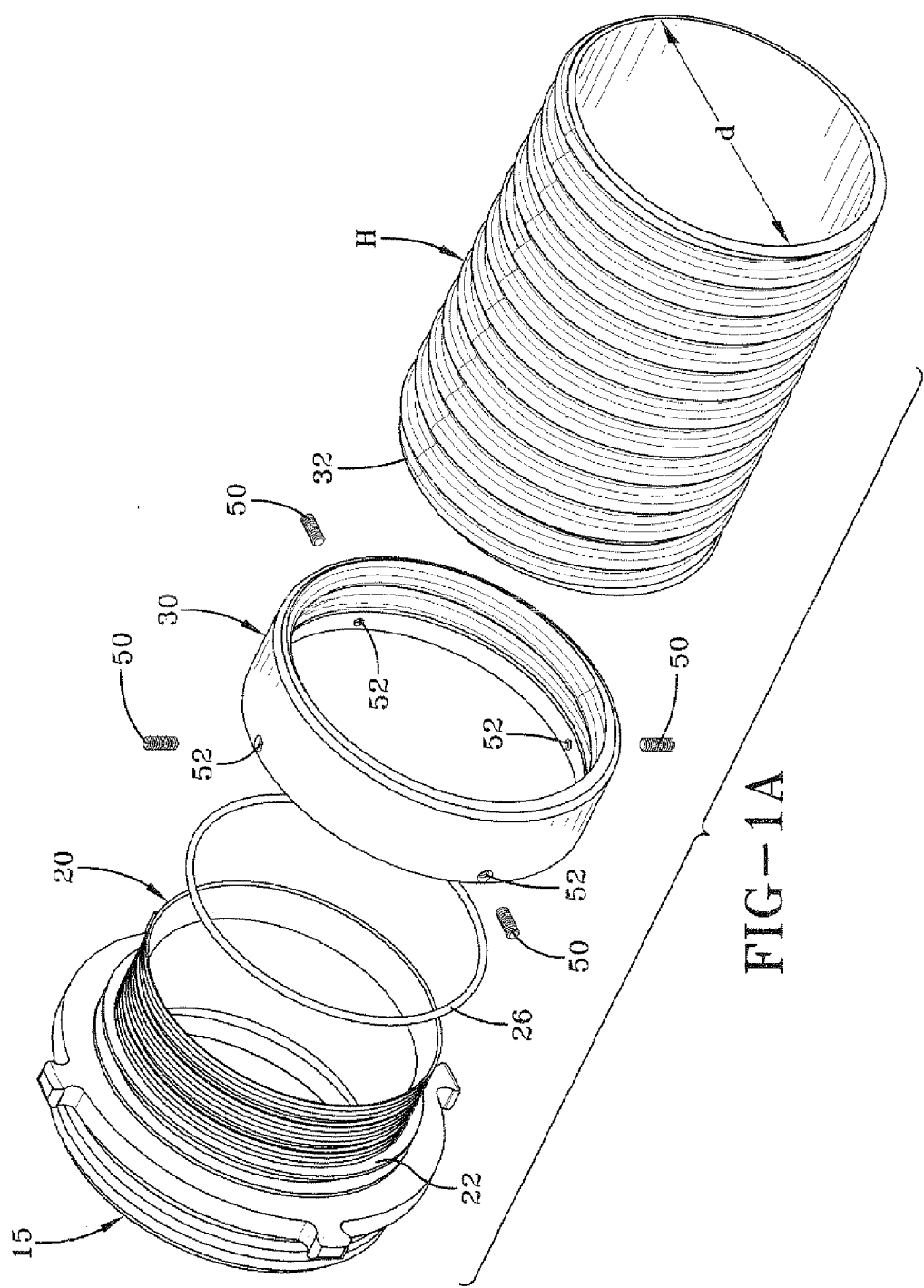

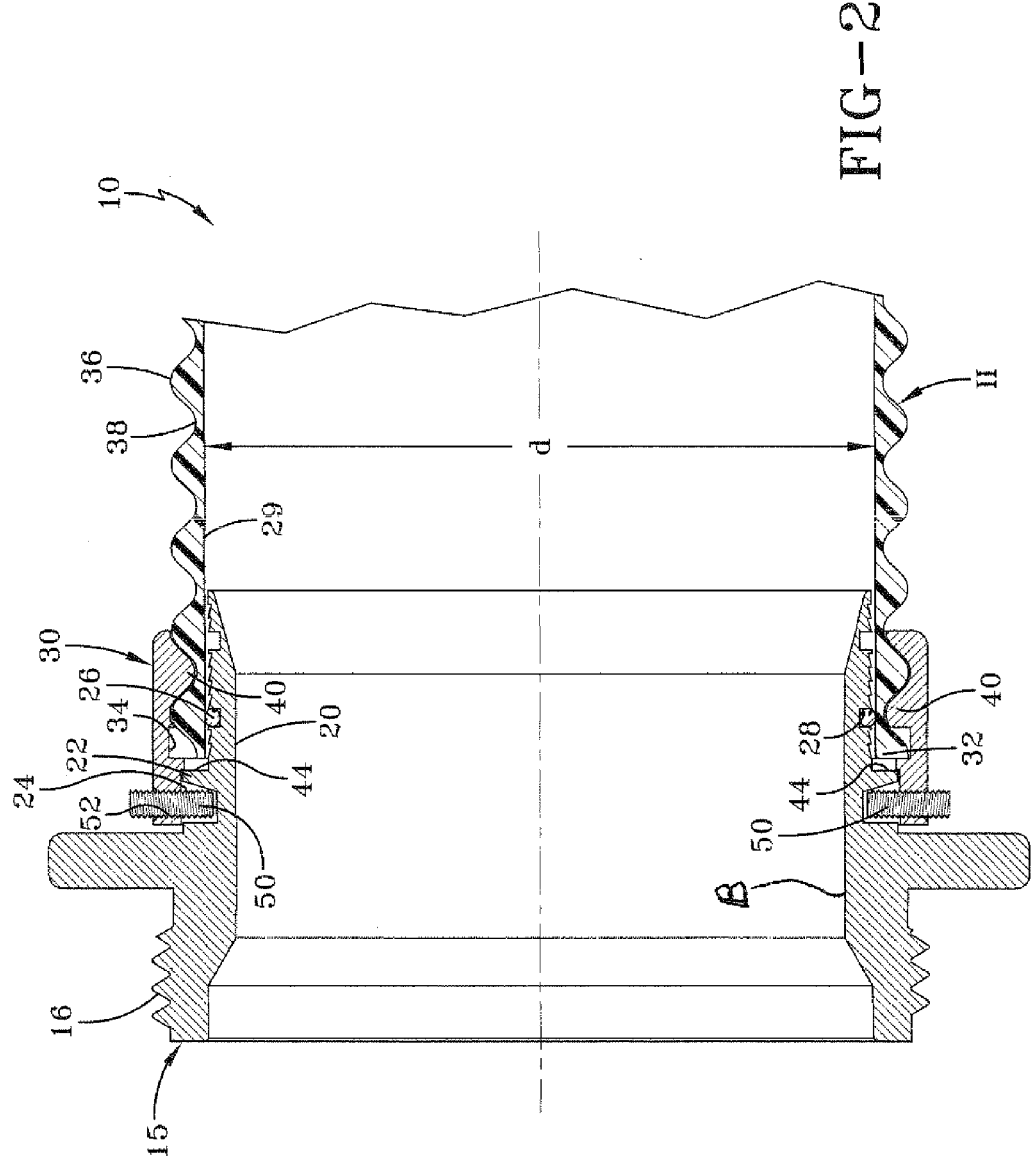

SUCTION LINE COUPLING FOR EMERGENCY VEHICLES

RELATED PATENT APPLICATIONS

This application claims the benefit of U.S. Provisional Patent application Ser. No., 611476,515, filed on Apr. 18, 2011, incorporated by reference, as if fully rewritten herein.

TECHNICAL FIELD

In general, the present invention relates to a coupling for the end of a hose used to draw water into an emergency vehicle. In particular, the present invention relates to a coupling having a hose shank and a collar that attaches to the hose shank. The collar is a monolithic part and attaches to an end of the hose before it is attached to the hose shank.

BACKGROUND OF THE INVENTION

Emergency vehicles used to fight fires or otherwise provide water at an emergency scene may obtain water from a pond or other freestanding water supply by providing a suction hose, also referred to as a suction line, from the emergency vehicle into the freestanding water supply to draw water from that supply into the emergency vehicle. Once the water is drawn into the emergency vehicle, it is pumped from the vehicle through smaller diameter fire hose at an increased pressure for distribution. The suction hose used for free standing water supplies has a relatively large diameter, which may be greater than six inches. A coupling is provided at one end of the hose to attach the hose to the emergency vehicle. Existing couplings include a shank portion typically made of metal having an internal thread that mates with the threads on the emergency vehicle. The shank portion includes a shank that extends within the suction hose. In some existing designs, the hose is clamped against the shank by a clamp. Two or three piece hose clamps are known in the art, where fasteners join the pieces together and provide the clamping force to hold the hose against the shank.

In one prior art device, the hose clamp includes two semicircular clamp pieces. The interior of the clamp pieces also includes a gripping member designed to engage ribs or other surfaces of the suction hose to better secure the hose relative to the shank portion, To complete attachment of the coupling, each hose clamp piece includes fastening bosses at each end of the clamp piece that abut corresponding fastening bosses on the opposite clamp piece when the pieces are tit on either side of the hose. A pair of fasteners are threaded through eyes formed in each of the fastener bosses and secured by a nut that compresses the two hose clamp pieces against each other. Plastic clamps may require additional length to provide sufficient clamping force, For example in one existing design a four inch collar is used to provide the needed clamping force, in another design, the clamp pieces include a groove that fits over a lip formed on the shank to help restrict axial movement of the collar relative to the shank once the pieces are clamped together.

Attachment of the coupling using the two piece clamp is difficult in that the user has to manipulate the end of the a large diameter hose, position the clamp pieces, and secure two fasteners on either end of the clamp pieces. Typically, the suction hose and coupling are sold as a unit. When assembling the hose and coupling, often one side of the clamp is properly secured and the other is not resulting in an improper securement of the hose. If detected at the manufacturing facility, the hose and clamp may be reassembled before shipment, If the hose and coupling are shipped in this condition, however, it may require reassembly in the field. To avoid lost time in assembling the hose and coupler at the manufacturing facility or in the field, a simpler coupling for a suction line is needed.

SUMMARY OF THE INVENTION

The present invention provides a simpler coupling for suction hose by providing a single piece collar used to attach the end of the suction hose to a shank portion that mates with the emergency vehicle, The collar attaches to the end of a polyvinyl chloride (PVC) suction hose or other hose commonly used in the industry. The collar is provided with a recess that receives the annular flange formed on the shank to secure the collar to the shank. A removable fastener such as a set screw is inserted through the collar projecting inward beneath the flange to axially fix the collar relative to the shank. The shank may then be attached to an emergency vehicle to attach the suction line to the vehicle.

DESCRIPTION OF THE DRAWINGS

FIG. 1A is an exploded perspective view of the coupling and hose.

FIG. 2 is a section side elevational view as might be seen along line 2-2 in FIG. 1.

DETAILED DESCRIPTION OF THE INVENTION

Figure 1:
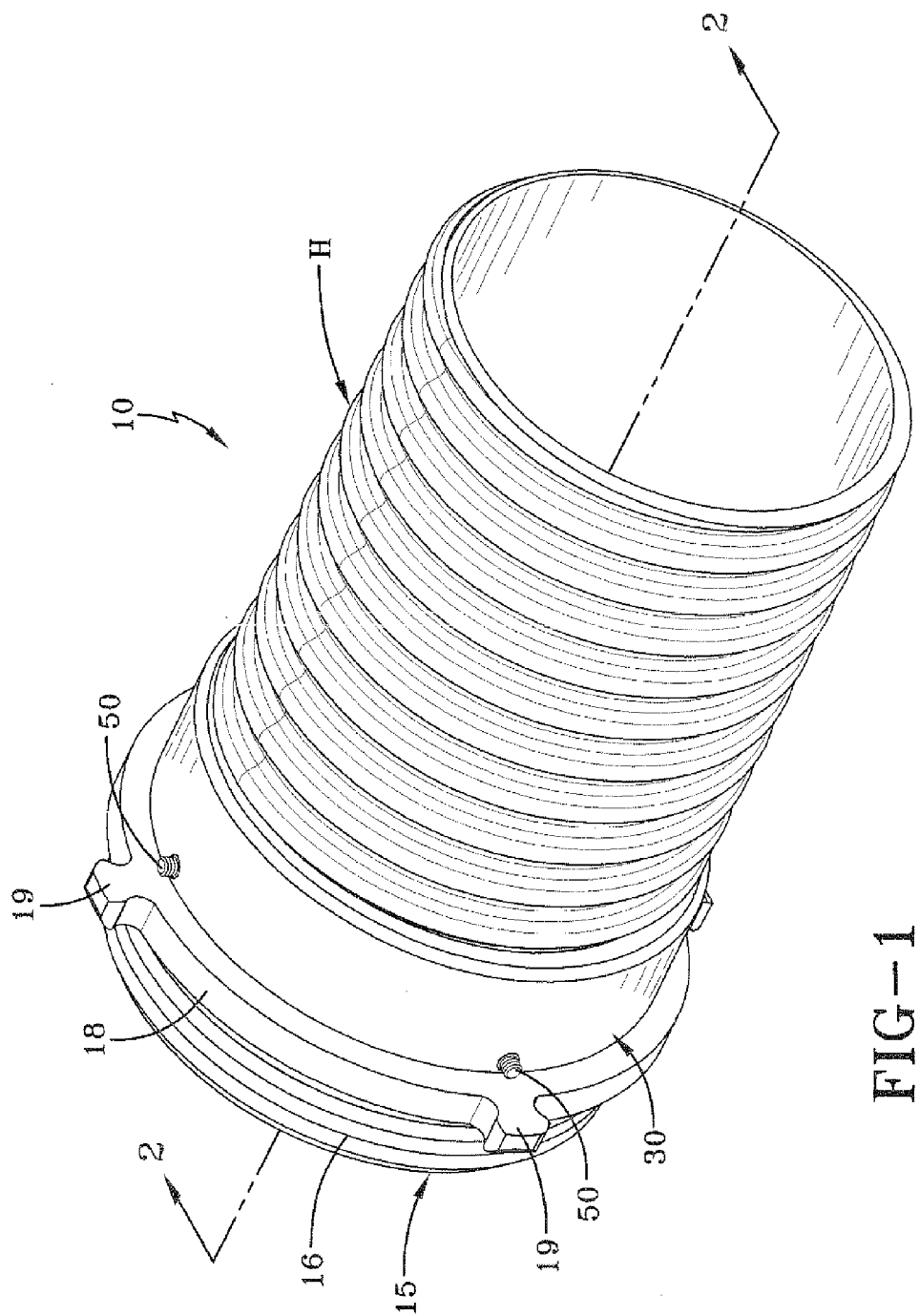
FIG. 1 is a perspective view of a coupling according to the present invention shown mounted on a hose.
Figure 4:
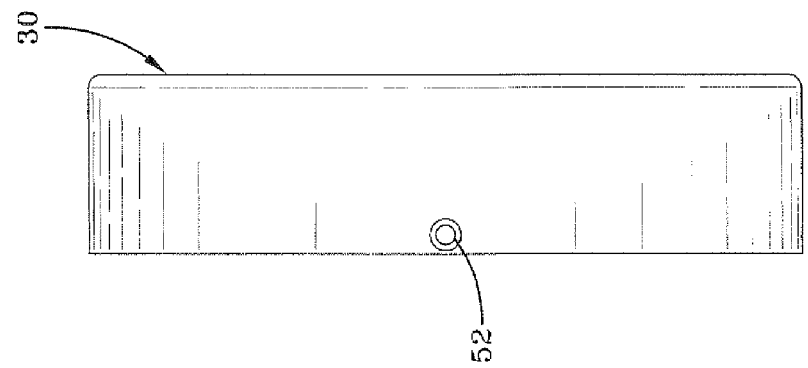
FIG. 4 is a side elevational view of the coupling shown in FIG. 3.

A coupling, generally indicated by the number 10, according to the concepts of the present invention is depicted in the drawings. The coupling 10 is used to attach a suction line or hose H to an emergency vehicle. The coupling 10 includes a shank 15 and a collar 30, described more completely below, that are coupled to each other to attach hose H to the coupling 10 and subsequently attach hose H to the emergency vehicle.

Shank 15 defines a bore to allow fluid flow from hose H to the emergency vehicle. The bore B is generally cylindrical in shape and may expand radially outward at each end, as best shown in FIG. 2. Shank 15 generally has a first portion 20 that is insertable within the hose H and a second portion that is external to hose H and is used to attach hose H to the emergency vehicle. For example, as shown, the second portion may have an external thread 16 that mates with an internally threaded fitting provided on the emergency vehicle. Alternatively, shank 15 may have an internal thread or attach using as non-threaded connection. The coupling 10 may be attached. at each end of hose H with one coupling having an internal thread on second portion and the other coupling having an external thread on its second portion. This allows multiple suction lines to be joined together via couplings, and otherwise facilitates attachment of the hose H in the field. It will be appreciated that the threading of shank 15 may vary based on the fitting used on the emergency vehicle or hose to which shank 15 is attached. Shank 15 may also include an outwardly projecting ring 18 having lugs or other hand holds 19 that facilitate handling of the coupling 10 when attaching it to the emergency vehicle or hose.

As best seen in FIG. 2, shank 15 includes a male or first portion 20 sized to fit within the inner diameter d of the hose H. First portion 20 may have threads on its interior or exterior surface, but in some cases a non-threaded connection may be used. In the example shown, first portion 20 has threads formed on its exterior surface, in general, the first portion 20 is inserted within hose H and may be used as a surface against which the hose H is clamped. First portion 20 may also provide a surface for scaling the hose H to coupling 10. As best shown in FIGS. 1A and 2, a seal 26, such as an O-ring, gasket, or other similar resilient seal, may he secured within a groove 28 formed in first portion 20 and adapted to contact the interior surface 29 of hose H to create a sealing relationship between the hose H and first portion 20.

With reference to FIGS. 1A and 2, shank 15 also includes a flange 22 formed at the base of the first portion 20. As discussed in more detail below, flange 22 provides a. point of attachment for the collar 30 used to axially secure the hose H to shank portion 15. In the example shown, the flange 22 is an annular flange extending about the circumference of shank 15, and is spaced axially from ring 18 to define, a groove 24 between the ring 18 and the flange 22.

Collar 30 is a single piece or monolithic ring that has an inner diameter generally corresponding to the exterior diameter of the hose H. Collar 30 is sized to fit over an end 32 of hose H. Collar 30 may be attached to the end 32 of hose H to make it easier for the user to then attach the hose H to shank 15. Some existing couplings that use multiple clamp pieces would require the simultaneous attachment of the clamp pieces to each other and attachment of the hose to the shank portion. By first attaching the collar 30 to end 32 of hose H, attachment of the hose H to the shank 15 is simplified. In this way, the user simply fits end 32 of hose H having the collar 30 attached thereon onto shank 15 and then secures the collar 30 to the shank 15 as described more completely below.

Attachment of the collar 30 to hose H may be accomplished in any known manner including fasteners, adhesives, or an interference fit created by sizing the inner surface 34 of collar 30 so that it compresses the outer diameter of hose H. An interference fit may facilitate mounting the collar 30 on hose H initially, but further securement of the collar 30 to hose H may be needed. to ensure that the hose H does not come loose from the coupling 10 during operation.

Figure 3:
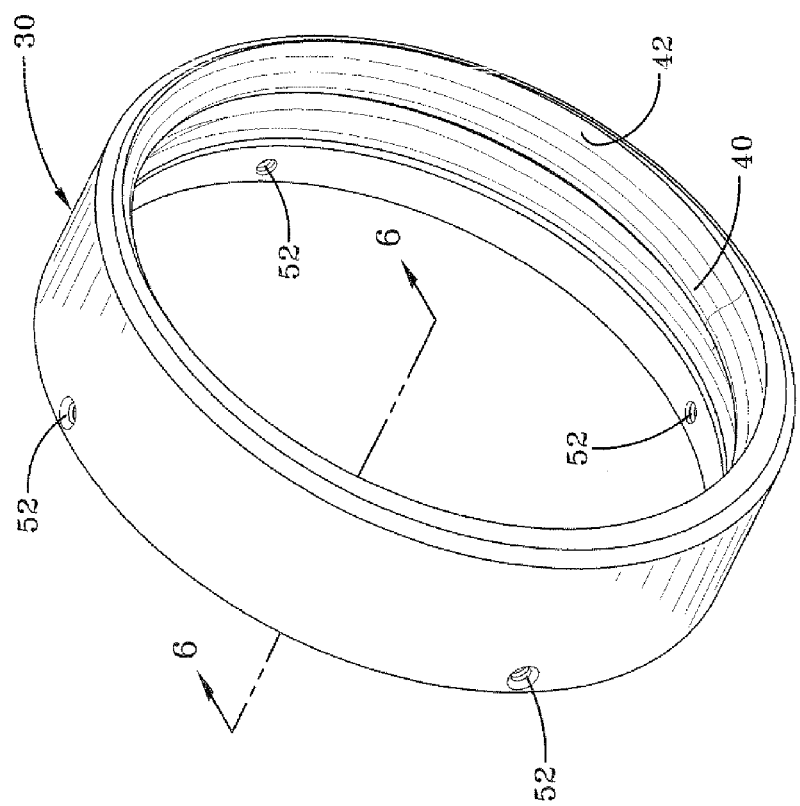
FIG. 3 is a perspective view of the coupling according to the present invention.
Figure 7:
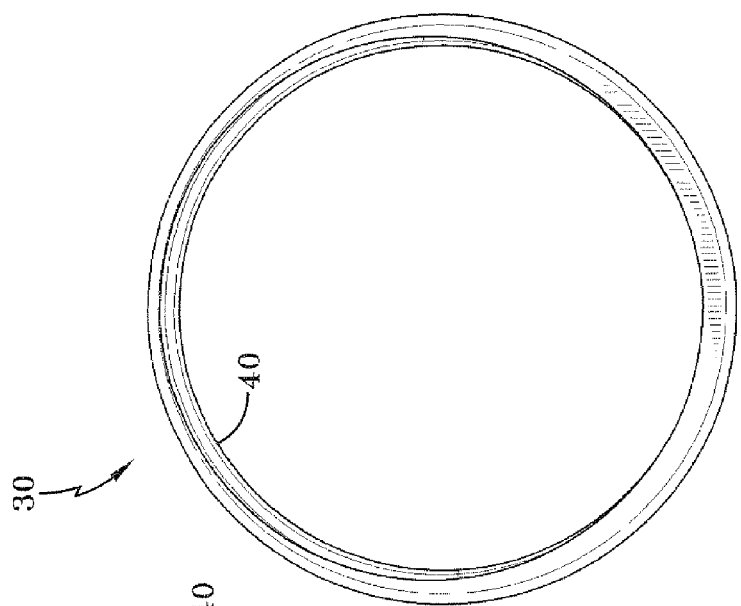
FIG. 7 is a rear elevational view of the coupling shown in FIG. 3.
Figure 6:
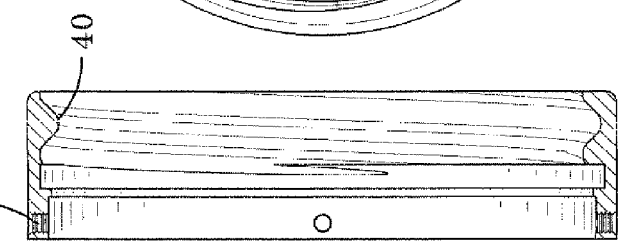
FIG. 6 is a sectioned side elevational view of the coupling shown in FIG. 3.
Figure 5:
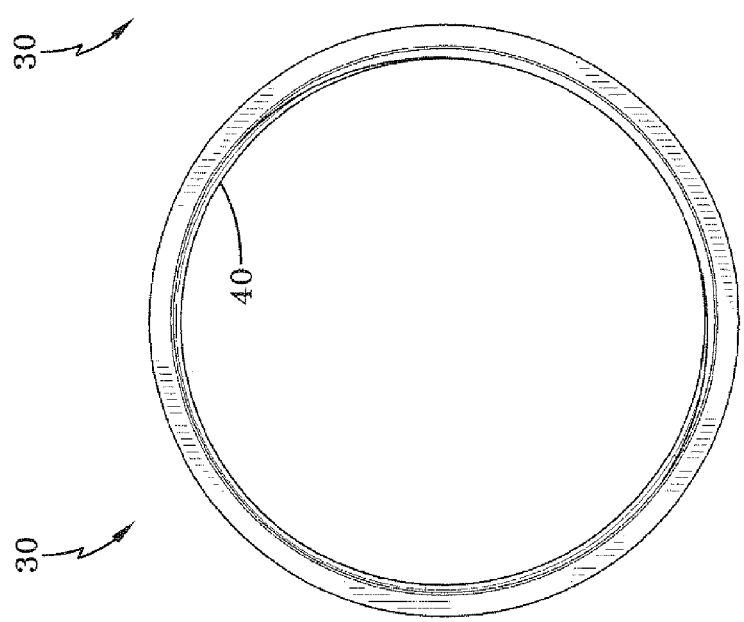
FIG. 5 is a front elevational view of the coupling shown in FIG. 3.

As shown in. FIG. 2, it is common for suction hose H to have a corrugated outer surface, which may be formed by one or more reinforcing ribs that spirally wound within the hose H, or the hose may be molded with corrugations. The corrugations form a pattern of outwardly projecting surfaces or peaks 30 spaced from each other by valleys 38 along the outer surface of hose H. To attach collar 30 to hose H, an internal projection such as a thread generally indicated at 40 in FIG. 3, may be formed on the interior surface 42 of collar 30. Internal thread 40 may have a spiral shape closely approximating the spiral reinforcement or corrugations formed on hose H. In general, however, any projection capable of fitting within a valley 38 to engage the corrugations and prevent the hose H from moving axially relative to collar 30 is acceptable. The internal thread 40 is beneficial in that it facilitates attachment of the collar 32 hose H by simply threading collar 30 onto hose H using the spiral pattern formed by the corrugations of the hose H. As shown in FIG. 2, this allows collar 30 to be threaded onto the end 32 of hose H to attach collar 30 to hose H. As shown, thread 40 is received within the valleys 38 between peaks 36. As demonstrated by this example, the corrugations or reinforcing ribs on the hose H acts as an external thread for attachment of the collar 30 thereto. With the thread 40 residing between peaks 36, axial movement of the collar 30 relative to hose H is prevented creating a secure point of attachment to shank 15. It will be appreciated that other inwardly projecting surfaces may be used in place of thread 40 to the same effect, and therefore, the thread 40 shown should not be considered limiting.

As discussed above, attaching the collar 30 before attempting to attach hose to shank 15 simplifies attachment of hose H since the user or other person assembling the hose, does not have to manipulate multiple clamp pieces and hold the hose H while securing the hose H with fasteners. With the collar 30 threaded onto the hose H, the user fits the collar 30 over first portion 20 until the hose H is near the outer surface 44 of flange 22. As best. seen in FIG. 2, collar 30, when attached to the hose H, has a portion that extends axially outward from hose H. A fastener 50 is carried on this portion to engage shank 15 to restrict axial movement of the collar 30 relative to shank 15. With the collar 30 attached to hose H, fastener 50 also fixes the axial position of the hose H relative to shank 15. in this way, hose H is coupled to shank 15. Fastener 50, may include a set screw, pin, cam lock, or other securement member is selectively extended inward to extend past flange 22 or be received in a receiver such as groove 24. Fastener 50 may be carried in a receiver 52 formed in collar 30. In the depicted example, fastener 50 extends from receiver 52 into the groove 24 formed on the opposite side of flange 22 to secure the collar 30 to the shank 15. As best seen in FIG. 2, when a threaded fastener 50 is used, receiver 52 may have an internal thread that corresponds to the external thread on fastener 50. For example, as shown, receiver 52 may extend through collar 50 and have an internal thread allowing a set screw to be threaded through collar 30 and extend into groove 24. To that end, the set screw has a length greater than the thickness of collar 30. As best shown in FIG. 2, fastener 50 may include plural fasteners spaced about collar 30. For example, as shown, a first fastener 50A and a second fastener 508 are diametrically opposed relative to each other and carried by corresponding receivers 52 formed in collar 30 to provide two points of attachment for collar 30, In the example shown, threaded receivers 52 are provided and set screws are used as the fastener 50. The set screws shown are merely an example and other similar fasteners may be used including detents or other resilient fasteners. Alternatively, collar 30 may be provided with spring loaded fasteners carried on collar 30 to further simplify the attachment process. Therefore, depending on the type of fastener 50 used, receiver 52 may extend only partially into collar 30, completely through collar 30, or may be omitted when fastener 50 is an integral part of collar 30.

The shank 15 and collar 30 may be constructed of any suitable material used to construct fittings for hoses in similar applications including but not limited to plastics, metals, and composite materials. In the example shown, shank 15 and collar 30 are constructed of aluminum.

The present invention improves upon couplings used to attach a suction line to an emergency vehicle by simplifying attachment of the suction line to a coupling that attaches to the vehicle. In particular, using a solid collar instead of two clamp pieces removes the need to attach the clamp pieces to each other. Instead, the collar 30 is attached to an end of the hose H and then the collar 30 is attached to the shank 15 to complete attachment of the coupling 10 to hose H. In addition to simplifying the attachment procedure, use of the single collar as opposed to the multiple. clamp pieces known in the art reduces the likelihood of the pieces being lost or individually damaged. In addition, while collar 30 may be made of any material, its term makes it easier to manufacture from metal than the clamp pieces found in the art. The clamp pieces in the art are generally made of plastic and are more susceptible to damage and normal wear and tear that makes them ineffective for attaching the hose to the coupling.

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occurred to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A coupling for a suction line comprising:
   a collar having an inner surface, an internal projection formed on the inner surface of the collar and adapted to be received in the valley of the suction lines to restrict axial movement of the suction line relative to the collar;
   a receiver formed in the collar axially outward of the internal projection;
   a shank having a first portion adapted to be inserted within the suction line and a second portion extending outward of the first portion; wherein the second portion is adapted to attach the hose shank to the emergency vehicle;
   a flange extending radially outward between the first portion and the second potion; and
   a fastener adapted to selectively extend from the receiver radially inward relative to the flange when located axially outward of the flange; and
   an annular ring extending outward from the shank portion, wherein a groove is formed between the ring and the annular flange.

2. The coupling of claim 1, wherein the shank portion has an external thread.

3. The coupling claim 1, wherein the receiver extends through the collar, and the fastener is a set screw, wherein the receiver had an internal thread adapted to engage a thread on the set screw.

4. The coupling of claim 1, wherein the flange is an annular flange extending about the circumference of the shank, the collar having a second fastener diametrically opposed to the fastener, the second fastener being selectively extendable radially inward relative to the flange when located axially outward of the flange.

5. A coupling for a suction line comprising:
   a collar having an inner surface, an internal projection formed on the inner surface of the collar and adapted to be received in the valley of the suction lines to restrict axial movement of the suction line relative to the collar;
   a receiver formed in the collar axially outward of the internal projection;
   a shank having first portion adapted to be inserted within the suction line and a second portion extending outward of the first portion, wherein the second portion is adapted to attach the hose to the emergency vehicle;
   a flange extending radially outward between the first portion and the second potion; and
   a fastener adapted to selectively extend from the receiver radially inward relative to the flange when located axially outward of the flange; and
   an annular ring extending outward from the shank portion, wherein a groove is formed between the ring and the annual flange.

6. The coupling of claim 5, wherein the annular ring further includes plural lugs extending radially outward there from, wherein the lugs are spaced about the annual ring.

7. A suction line comprising:
   a hose having a corrugated outer surface defining plural peaks and at least one valley at at least one end of the hose;
   a coupling attachable to the at least one end of the hose, the coupling including:
   a collar formed as a single piece, the collar carrying an inward extending projection adapted to be received within the at least one valley and limit axial movement of the collar by contacting at least one of the plural peaks, on the outer surface of the hose;
   a shank having a first portion receivable inside the at least one end of the hose, and a second portion extending outward of the first portion, and a flange located axially outward of the first portion extending radially outward relative to the first portion; wherein said collar carries a fastener located axially outward of the end of the hose, the fastener being positionable axially outward of the flange and selectively extendable radially inward of the flange to axially restrict movement of the collar;
   wherein the shank defines a groove axially outward of the flange and wherein the fastener is extendable to be received within the groove to limit axial movement of the collar relative to the shank in the inward and outward directions.

8. The suction line of claim 7, further comprising a seal carried on the first portion of the shank and engagable with an interior surface of the hose.

9. The suction line of claim 7, wherein the second portion of the shank has an external thread formed thereon at an outward end of the shank.

10. The suction line of claim 7, wherein the first portion of the shank has a threaded outer surface.

11. The suction line of claim 7, wherein the shank includes an annular ring formed on the second portion, wherein the groove is defined between the ring and the flange.

12. A suction line comprising:
   a hose having a corrugated outer surface defining plural peaks and at least one valley at at least one end of the hose;
   a coupling attachable to the at least one end of the hose, the coupling including:
   a collar formed as a single piece, the collar carrying an inward extending projection adapted to be received within the at least one valley and limit axial movement of the collar by contacting at least one of the plural peaks, on the outer surface of the hose;
   a shank having a first portion receivable inside the at least one end of the hose, and a second portion extending outward of the first portion, and a flange located axially outward of the first portion extending radially outward relative to the first portion; wherein said collar carries a fastener located axially outward of the end of the hose, the fastener being positionable axially outward of the flange and selectively extendable radially inward of the flange to axially restrict movement of the collar;
   wherein the first portion of the shank, defines a groove extending inward from the outer surface of the first portion, wherein, a gasket is received in the groove and extends radially outward to sealingly engage the inner surface of the hose.

13. The suction line of claim 12, wherein the collar defines a threaded receiver extending through the collar and wherein the fastener is a set screw threadably received within the receiver.

14. A suction line comprising:
 a hose having a corrugated outer surface defining plural peaks and at least one valley at at least one end of the hose;
 a coupling attachable to the at least one end of the hose, the coupling including:
 a collar formed as a single piece, the collar carrying an inward extending projection adapted to be received within the at least one valley and limit axial movement of the collar by contacting at least one of the plural peaks, on the outer surface of the hose;
 a shank having a first portion receivable inside the at least one end of the hose, and a second portion extending outward of the first portion, and a flange located axially outward of the first portion extending radially outward relative to the first portion; wherein said collar carries a fastener located axially outward of the end of the hose, the fastener being positionable axially outward of the flange and selectively extendable radially inward of the flange to axially restrict movement of the collar;
 wherein the flange is an annular flange extending about the circumference of the shank, wherein a second fastener is carried on the collar diametrically opposite the fastener, the second fastener being selectively extendable radially inward relative to the flange.

15. The suction line of claim 14, wherein the inward projection on the collar is an internal thread spirally formed to threadably engage the at least one valley and the plural peaks of the corrugated outer surface of the hose.

16. The suction line of claim 14, wherein the hose includes a reinforcing rib that forms the corrugated outer surface and defines the plural peaks and a valley there between that spiral about the outer surface of the hose

* * * * *